(No Model.)
D. E. KEMPSTER.
CURTAIN FIXTURE.
No. 305,455. Patented Sept. 23, 1884.
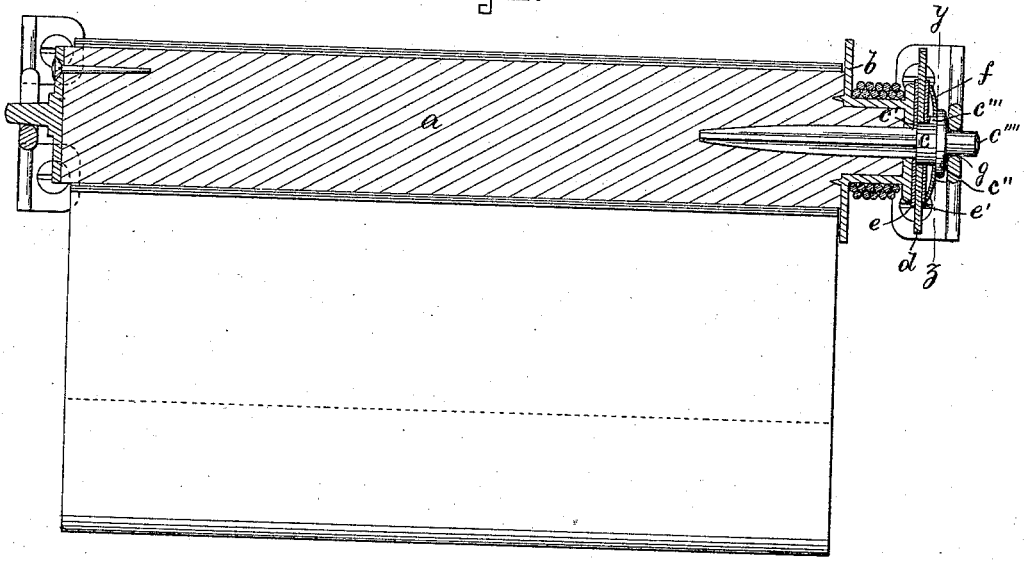
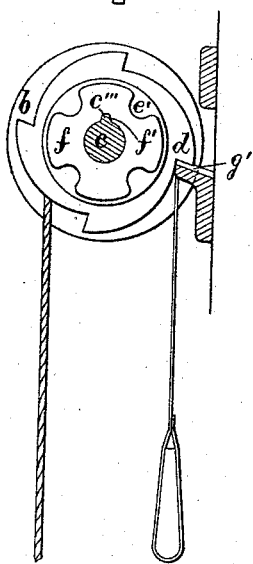
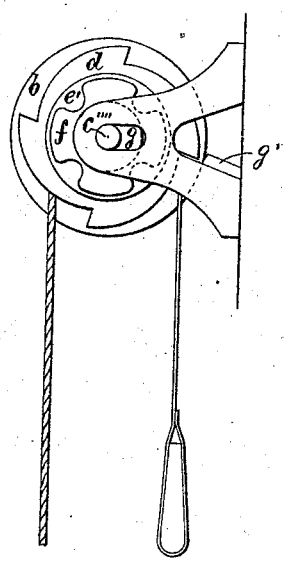
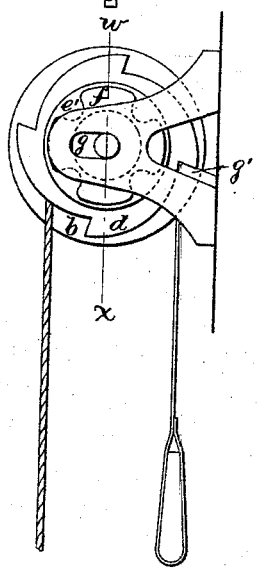
Witnesses
Henry Chadbourn
H. Allen
Inventor
Daniel E. Kempster.

UNITED STATES PATENT OFFICE.

DANIEL E. KEMPSTER, OF BOSTON, MASSACHUSETTS, ASSIGNOR TO CHARLES H. CUSHMAN, OF SAME PLACE.

CURTAIN-FIXTURE.

SPECIFICATION forming part of Letters Patent No. 305,455, dated September 23, 1884.

Application filed July 5, 1884. (No model.)

*To all whom it may concern:*

Be it known that I, DANIEL E. KEMPSTER, a citizen of the United States, residing at Boston, in the county of Suffolk and State of Massachusetts, have invented certain new and useful Improvements in Curtain-Fixtures; and I do hereby declare that the same are fully described in the following specification and illustrated in the accompanying drawings.

My invention relates to that class of curtain-fixtures in which the curtain is raised or lowered by the side cord, and in which, also, the curtain holding or sustaining ratchet is frictionally held to its roller, so that (if it be desirable) the curtain may be drawn down without taking hold of the side cord.

My improvement consists in simplifying the construction and combining the several pieces in the manner herein shown, whereby I am able to produce a friction-cord roller which can be manufactured very cheaply.

In the drawings, Figure 1 is an end elevation; Fig. 2, a sectional view on the line $w\,x$ in Fig. 1. Fig. 3 is a cross-section on the line $y\,z$ in Fig. 2, showing the spindle, spring, and the ratchet-plate engaged with the bracket-stop. Fig. 4 is an end elevation showing the ratchet-plate disengaged from the bracket-stop.

$a$ represents the roller having fastened on one end the pivot-plate, the pivot of which rests loosely in an open-top bracket in the usual manner. The other end of the roller is turned down to form a tenon, and has tightly pressed thereon the cord-spool $b$, having spurs to enter the wood and prevent it from turning thereon. The outer end of the spool has a hole through it corresponding to a hole in the center of the tenon on the roller. A spindle, $c$, formed with a shank of a suitable size, is driven tightly into the hole in the spool and roller until the shoulder $c'$ on the spindle comes up against the end of the spool or washer $e$. The shoulder acts as a stop to drive against, and also holds the spool tightly on the tenon of the roller. The spindle is round between the shoulder and a collar, $c''$, on the spindle. Said collar is far enough away from the shoulder to permit a ratchet-plate, $d$, washer $e'$, and spring $f$ to be placed thereon. The washers are preferably card-board or some fibrous material, and are placed one each side of the ratchet-plate. This prevents the two metal pieces from making any noise and causes a smooth friction. The spring $f$ is concaved or cupped, and is also separated radially half-way from its outer edge in toward the central hole, thereby forming flexible leaves. Said spring is placed on the spindle with its concaved side toward the ratchet-plate, and thus only its outer edge bears against the washer $e'$. The spindle $c$ has cast upon it, just inside the collar $c''$, a lug or projection, $c'''$. A corresponding cavity, $f'$, is made in one side of the edge of the hole in the spring $f$. This locks fast together the spring $f$ and spindle $c$, and gives a smooth and even friction on the outer edge of the spring against the card-board washer, when the ratchet-plate is held and the spindle revolved. The outer end of the spindle $c$ has a pivot, $c''''$.

The parts combined and arranged as herein shown and described are very conveniently and rapidly put together on a roller, as, all the springs $f$ being a proper gage in thickness, and all being cupped alike, it is only necessary first, by one blow of a foot-press, to drive onto the tenoned end of the roller a spool, $b$. The spring $f$, ratchet-plate $d$, and washers $e\,e'$ being placed properly on the spindle $c$, the shank of the spindle is inserted in the central hole of the roller, and one blow of the press drives it in solid till the shoulder $c'$ strikes against the end of the cord-spool $b$. This compresses every spring alike and gives just the desired amount of friction on the ratchet-plate to cause it, when held from revolving, to sustain the weight of the heaviest curtain. The right-hand bracket is formed with a slot, $g$, in which the spindle-pivot $c''''$ is free to rotate and travel back and forth by such rotation when not prevented. On the foot of the bracket is cast a lug or stop, $g'$, in line of rotation of the ratchet-plate $d$. The slot $g$ is of sufficient length to allow the ratchet-plate to engage or disengage the stop $g'$, as may be desired.

The operation is as follows: The cord being wound on the spool $b$, so as to hang on the side farthest from the window, and the curtain being down, the ratchet engages the stop, as shown in Fig. 1. On drawing on the cord the rotation of the spindle-pivot $c''''$ carries the ratchet away from the stop, as shown in Fig. 4, and the curtain may be raised to any desired height, and by letting go of the cord the spindle-pivot will rotate and automatically carry the ratchet into engagement with the stop, and thus prevent any further descent of the curtain. To lower the curtain, draw it down without using the side cord, as, although the ratchet-plate is held from turning by the bracket-stop, the roller and spindle are only held by the friction of the spring $f$. If at any time it is desirable to lower the curtain by the side cord, as when the curtain is up out of reach, it may be accomplished by drawing out the cord horizontally and allowing it to slip through the hand. The ratchet-plate can then revolve without engaging the bracket-stop.

It will be seen that the parts are all of the simplest construction, and they are so contrived that but very little labor is required in fitting them up and putting on the rollers.

I claim—

In a curtain-fixture, the combination of the roller $a$, its attached spool $b$, loose ratchet-plate $d$, washers $e\ e'$, and spring $f$, non-rotatively attached to the pivot end of the shouldered spindle $c$, which is adapted to be driven into the roller end, combined with a bracket having the horizontal slot $g$ and the ratchet-engaging stop $g'$, all being constructed and arranged for conjoint operation as herein shown and described.

In testimony whereof I affix my signature in presence of two witnesses.

DANIEL E. KEMPSTER.

Witnesses:
JOHN H. FOSTER,
FRANCIS ALLEN.